(12) United States Patent
Du et al.

(10) Patent No.: US 11,645,880 B2
(45) Date of Patent: May 9, 2023

(54) VEHICLE FAULT DIAGNOSTICS AND PROGNOSTICS USING AUTOMATIC DATA SEGMENTATION AND TRENDING

(71) Applicant: GM GLOBAL TECHNOLOGY OPERATIONS LLC, Detroit, MI (US)

(72) Inventors: Xinyu Du, Oakland Township, MI (US); Zhongyu Yang, Farmington Hills, MI (US); Joshua J. Sanchez, Clinton Township, MI (US); Kevin M. Corr, Sterling Heights, MI (US); Yilu Zhang, Northville, MI (US); Mateusz M. Nowak, Dearborn, MI (US)

(73) Assignee: GM GLOBAL TECHNOLOGY OPERATIONS LLC, Detroit, MI (US)

( * ) Notice: Subject to any disclaimer, the term of this patent is extended or adjusted under 35 U.S.C. 154(b) by 155 days.

(21) Appl. No.: 17/148,643

(22) Filed: Jan. 14, 2021

(65) Prior Publication Data
US 2022/0222981 A1 Jul. 14, 2022

(51) Int. Cl.
*G07C 5/08* (2006.01)

(52) U.S. Cl.
CPC ......... *G07C 5/0808* (2013.01); *G07C 5/0816* (2013.01)

(58) Field of Classification Search
CPC .................. G07C 5/0808; G07C 5/0816
See application file for complete search history.

(56) References Cited

U.S. PATENT DOCUMENTS

| | | | |
|---|---|---|---|
| 7,301,304 B2 | 11/2007 | Weisgerber et al. |
| 7,360,615 B2 | 4/2008 | Salman et al. |
| 7,545,109 B2 | 6/2009 | Salman et al. |
| 7,567,086 B2 | 7/2009 | Salman et al. |
| 7,725,275 B2 | 5/2010 | Zhang et al. |
| 7,741,805 B2 | 6/2010 | Zhang et al. |
| 7,761,389 B2 | 7/2010 | Medasani et al. |
| 7,983,862 B2 | 7/2011 | Zhang |
| 8,005,632 B2 | 8/2011 | Zettel et al. |
| 8,078,415 B2 | 12/2011 | Rajagopalan et al. |
| 8,084,996 B2 | 12/2011 | Zhang et al. |
| 8,099,206 B2 | 1/2012 | Shin et al. |
| 8,111,037 B2 | 2/2012 | Zhang et al. |
| 8,159,189 B2 | 4/2012 | Zhang |
| 8,212,527 B2 | 7/2012 | Zhang et al. |
| 8,315,829 B2 | 11/2012 | Zhang |

(Continued)

OTHER PUBLICATIONS

U.S. Appl. No. 16/214,813, filed Dec. 10, 2018, Sarwar et al.

(Continued)

*Primary Examiner* — Joseph J Dallo (57) ABSTRACT

A controller processes data from one or more sensors of a subsystem of a vehicle. The processing includes smoothing the data and calculating a mean of the data. The controller identifies a transition point in the processed data where a moving average of the data is less than the mean by a predetermined amount indicating a trend. The controller selects a segment of the processed data subsequent to the transition point, detects the trend in the segment using regression, and extrapolates the detected trend to reach a predetermined fault threshold. The controller predicts a failure of the subsystem based on a slope of the extrapolated trend and provides an indication of the prediction based on the slope to schedule a service for the subsystem.

20 Claims, 6 Drawing Sheets

(56) References Cited

U.S. PATENT DOCUMENTS

| | | | |
|---|---|---|---|
| 9,108,524 | B2 | 8/2015 | Zhang et al. |
| 10,042,006 | B2 | 8/2018 | Du et al. |
| 10,054,643 | B2 | 8/2018 | Sankavaram et al. |
| 10,215,148 | B2 | 2/2019 | Jiang et al. |
| 10,964,130 | B1* | 3/2021 | Dixit .................. G05B 23/0283 |
| 2009/0326841 | A1 | 12/2009 | Zhang et al. |
| 2015/0160098 | A1* | 6/2015 | Noda .................... G01M 99/00 702/35 |
| 2019/0042675 | A1* | 2/2019 | Martin .................... G06N 20/00 |
| 2020/0090419 | A1* | 3/2020 | Rajkumar ................ G07C 5/06 |
| 2020/0111272 | A1* | 4/2020 | Ferre Fabregas .. G05B 23/0283 |
| 2021/0272394 | A1* | 9/2021 | Celia ................... G05B 13/042 |
| 2021/0287459 | A1* | 9/2021 | Celia ................... G07C 5/0808 |

OTHER PUBLICATIONS

U.S. Appl. No. 16/595,738, filed Oct. 8, 2019, Du et al.
"RUL Prediction for Individual Units Based on Condition Monitoring Signals With a Change Point". Junbo Son et al. IEEE Transactions on Reliability, vol. 64, No. 1, Mar. 2015; 15 Pages.

* cited by examiner

VEHICLE FAULT DIAGNOSTICS AND PROGNOSTICS USING AUTOMATIC DATA SEGMENTATION AND TRENDING

INTRODUCTION

The information provided in this section is for the purpose of generally presenting the context of the disclosure. Work of the presently named inventors, to the extent it is described in this section, as well as aspects of the description that may not otherwise qualify as prior art at the time of filing, are neither expressly nor impliedly admitted as prior art against the present disclosure.

The present disclosure relates generally to vehicle fault diagnostics and prognostics systems and more particularly to vehicle fault diagnostics and prognostics using automatic data segmentation and trending.

A vehicle health management system comprises a diagnostics system, a prognostics system, and/or a fault mitigation system. The diagnostics system typically includes an on-board diagnostics module that indicates system level faults to the vehicle owner using indicators on the dashboard of the vehicle. The diagnostics system also includes advanced diagnostics used by service personnel to perform detailed fault analysis to find root cause of a problem down to component level. The on-board diagnostics module typically compares a signal level of a signal from a vehicle subsystem to a predetermined threshold and determines if the subsystem is faulty or not based on the result of the comparison. Service personnel typically use advanced diagnostics that can analyze signals from a plurality of components of the subsystem as well as other related subsystems and can determine the root cause of a problem down to component level.

The prognostics system can predict which component in the vehicle may fail in the near future. The prognostics system predicts a failure before the failure occurs. The prognostics system can assist the vehicle owner in scheduling service before the component fails. This way, the vehicle owner will not be stranded when the component fails. Some failures, however, occur suddenly and cannot be predicted. The fault mitigation system determines the vehicle operations to mitigate the impact of faults. For example, some faults are marginal and can be mitigated to allow the vehicle to be driven for some time until the fault is rectified by servicing the vehicle.

SUMMARY

A system comprises a plurality of sensors associated with a plurality of subsystems of a vehicle and a controller configured to communicate with the plurality of subsystems of the vehicle. The controller is configured to process data received from one or more sensors of one of the subsystems of the vehicle. The processing includes smoothing the data and calculating a mean of the data. The controller is configured to identify a transition point in the processed data where a moving average of the data is less than the mean by a predetermined amount indicating an upward trend or where the moving average is greater than the mean by the predetermined amount indicating a downward trend. The controller is configured to select a segment of the processed data subsequent to the transition point; detect a trend in the segment of the processed data subsequent to the transition point using regression, where the trend includes the upward trend or the downward trend; and extrapolate the detected trend to reach a predetermined fault threshold. The controller is configured to predict a failure of the one of the subsystems based on a slope of the extrapolated trend and provide an indication of the prediction based on the slope of the extrapolated trend to schedule a service for the one of the subsystems.

In other features, the controller is further configured to accurately diagnose a fault in the one of the subsystems, modify a control parameter of the vehicle to improve vehicle safety, and/or prolong life of a component of the one of the subsystems before the component fails using the detected trend.

In other features, the controller is further configured to detect a second trend in second data collected from the one or more sensors of one of the subsystems after the service; and evaluate the service based on at least one of whether a second slope of the second trend is greater than a second threshold and whether the second data is within a predetermined range.

In other features, the received data includes first and second data for first and second parameters of the one of the subsystems, respectively. The controller is further configured to determine whether to generate an alert about a condition of the one of the subsystems based on whether the first data for the first parameter has crossed a first threshold; and detect the trend using the second data for the second parameter. The second parameter is different than the first parameter.

In another feature, the controller is configured to provide the indication of the prediction in response to the slope of the extrapolated trend being greater than a first predetermined threshold.

In other features, the controller is configured to estimate an operational life of the one of the subsystems based on the slope of the extrapolated trend; and provide the indication of the prediction based on the estimation.

In another feature, the controller is configured to select a type the regression depending on a type of a parameter of the one of the subsystems for which the data is received.

In another feature, the controller is configured to detect the trend by excluding data before the transition point.

In other features, the controller is located in a computing device remote from the vehicle, and the computing device includes a mobile device, a service tool, or a server in a cloud.

In still other features, a system comprises a processor and a memory storing instructions that when executed by the processor configure the processor to process data received from a sensor of a subsystem of a vehicle, where the processing includes smoothing the data and calculating a mean of the data. The instructions configure the processor to identify a transition point in the processed data where a moving average of the data is less than the mean by a predetermined amount indicating an upward trend or where the moving average is greater than the mean by the predetermined amount indicating a downward trend. The instructions configure the processor to select a segment of the processed data subsequent to the transition point; detect a trend in the segment using regression, where the trend includes the upward trend or the downward trend; and extrapolate the detected trend to reach a predetermined fault threshold. The instructions configure the processor to predict a failure of the subsystem based on a slope of the extrapolated trend; and provide an indication of the prediction based on the slope of the extrapolated trend to schedule a service for the subsystem.

In other features, the instructions further configure the processor to accurately diagnose a fault in the subsystem, modify a control parameter of the vehicle to improve vehicle safety, and/or prolong life of a component of the subsystem before the component fails using the detected trend.

In other features, the instructions further configure the processor to detect a second trend in second data collected from the one or more sensors of the subsystem after the service; and evaluate the service based on at least one of whether a second slope of the second trend is greater than a second threshold and whether the second data is within a predetermined range.

In other features, the received data includes first and second data for first and second parameters of the subsystem, respectively. The instructions further configure the processor to determine whether to generate an alert about a condition of the subsystem based on whether the first data for the first parameter has crossed a first threshold; and detect the trend using the second data for the second parameter. The second parameter is different than the first parameter.

In another feature, the instructions further configure the processor to provide the indication of the prediction in response to the slope of the extrapolated trend being greater than a first predetermined threshold.

In other features, the instructions further configure the processor to estimate an operational life of the subsystem based on the slope of the extrapolated trend; and provide the indication of the prediction based on the estimation.

In another feature, the instructions further configure the processor to select a type the regression depending on a type of a parameter of the subsystem for which the data is received.

In another feature, the instructions further configure the processor to detect the trend by excluding data before the transition point.

In another feature, a computing device comprises the system of claim 10. The computing device is remote from the vehicle and includes a mobile device, a service tool, or a server in a cloud.

In still other features, a method comprises processing data received from a sensor of a subsystem of a vehicle, where the processing includes smoothing the data and calculating a mean of the data. The method comprises identifying a transition point in the processed data where a moving average of the data is less than the mean by a predetermined amount indicating an upward trend or where the moving average is greater than the mean by the predetermined amount indicating a downward trend. The method comprises selecting a segment of the processed data subsequent to the transition point; detecting a trend in the segment using regression, where the trend includes the upward trend or the downward trend; and extrapolating the detected trend to reach a predetermined fault threshold. The method comprises predicting a failure of the subsystem based on a slope of the extrapolated trend; and providing an indication of the prediction based on the slope of the extrapolated trend to schedule a service for the subsystem. The method comprises using the detected trend to accurately diagnose a fault in the subsystem, modify a control parameter of the vehicle to improve vehicle safety, and/or prolong life of a component of the subsystem before the component fails.

In other features, the method further comprises detecting a second trend in second data collected from the one or more sensors of the subsystem after the service; and evaluating the service based on at least one of whether a second slope of the second trend is greater than a second threshold and whether the second data is within a predetermined range.

Further areas of applicability of the present disclosure will become apparent from the detailed description, the claims and the drawings. The detailed description and specific examples are intended for purposes of illustration only and are not intended to limit the scope of the disclosure.

BRIEF DESCRIPTION OF THE DRAWINGS

The present disclosure will become more fully understood from the detailed description and the accompanying drawings, wherein.

In the drawings, reference numbers may be reused to identify similar and/or identical elements.

DETAILED DESCRIPTION

Diagnostics and prognostics systems typically generate alerts if fault signatures exceed predefined thresholds. These systems cannot generate the alerts if the fault signatures do not exceed the predefined thresholds. Often the fault signatures may not exceed the predefined thresholds when subsystems being monitored degrade rapidly or when data is not collected from the subsystems immediately before a failure/repair becomes imminent. For example, the latest data may not be available for analysis due to a communication failure if the processing is performed at a server in a cloud instead of onboard the vehicle. Fault diagnostics using historical data also poses other challenges. For example, repairs cannot be accurately evaluated and validated using the historical data, which can be problematic when the repairs involve OEM components with warranty claims.

To solve the above problems, the present disclosure provides an improved fault diagnostics and prognostics system that uses an automatic data segmentation and trending approach for situations including rapid subsystem degradation or lack of data. The system automatically segments the data and determines a point where the data changes from being normal to abnormal (i.e., indicating a problem). The system uses the data after the change point to determine a trend. The system extrapolates the trend to predict a failure along with other fault signatures.

Specifically, the system of the present disclosure uses moving averaging to smooth collected data before performing trend analysis. The system uses a data segmentation approach to determine the change point. The system uses regression to detect the trend. The system uses extrapolation to confirm severity of the trend. The system performs fault isolation using the detected trend and other fault signatures. The system can also validate repairs. Accordingly, the system of the present disclosure is more robust than and significantly improves the existing fault diagnostics and prognostics system for vehicles. These and other features of the present disclosure are described below in detail.

Figure 1A:
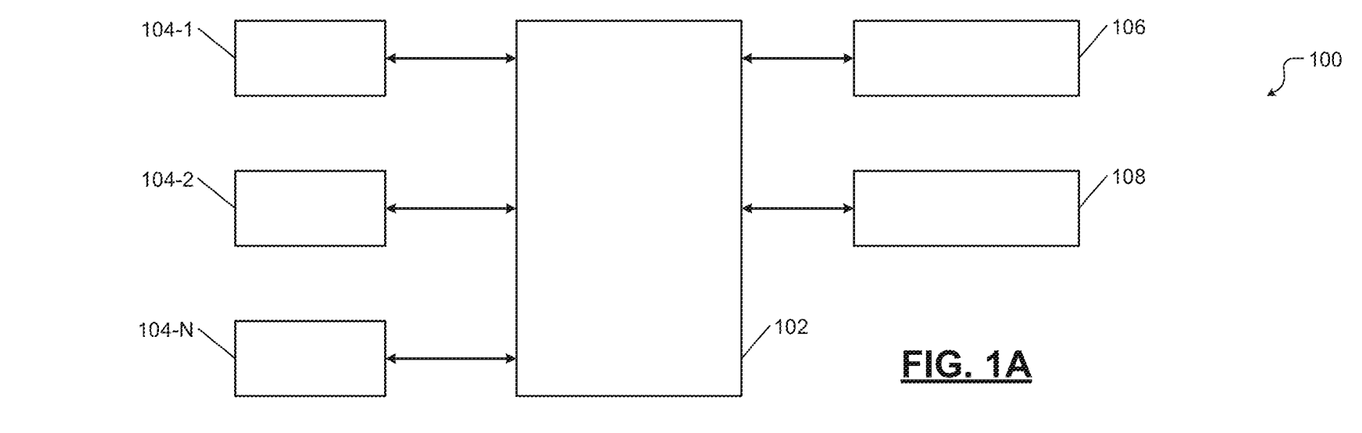
FIGS. 1A-1C show an example of a system for vehicle fault diagnostics and prognostics using automatic data segmentation and trending according to the present disclosure.
Figure 1B:
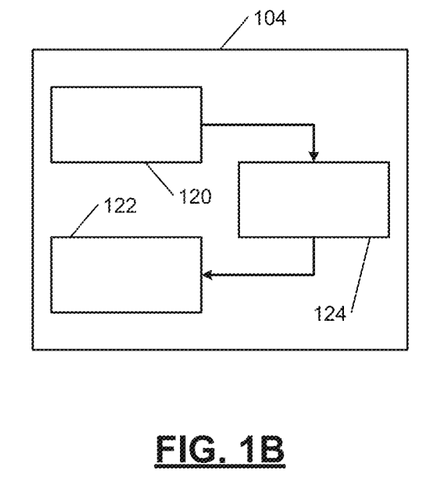
Figure 1C:
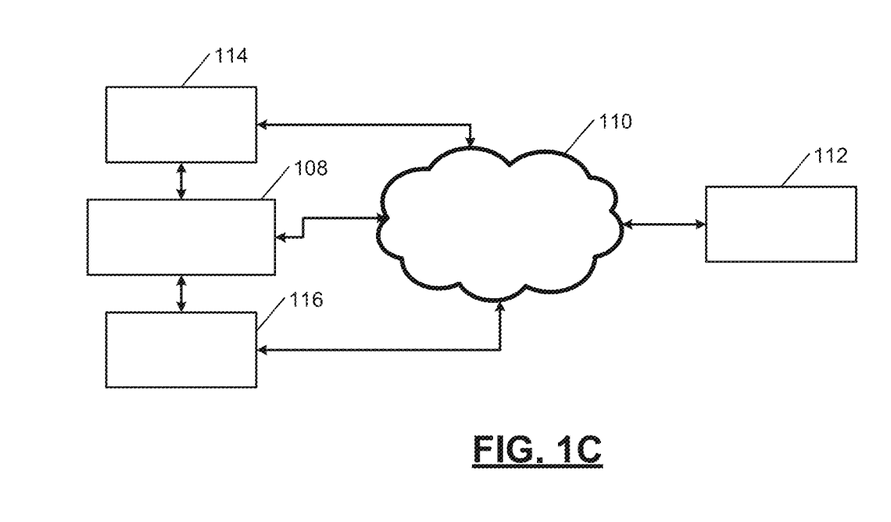

FIGS. 1A-1C show an example of a system 100 for vehicle fault diagnostics and prognostics using automatic data segmentation and trending according to the present disclosure. In FIG. 1A, the system 100 comprises a controller 102 that communicates with a plurality of subsystems 104-1, 104-2, . . . , and 104-N (collectively the subsystems 104) of a vehicle. For example, the subsystems 104 may include an engine subsystem, a transmission subsystem, an exhaust subsystem, a braking subsystem, a suspension subsystem, a battery subsystem, an HVAC subsystem, a navigation subsystem, an autonomous subsystem, and so on.

FIG. 1B shows that in general, each of the subsystems 104 can broadly comprise one or more sensors 120, one or more actuators 122, and a processor 124. The processor 124 receives data from the one or more sensors 120 and controls the one or more actuators 122. The processor 124 may also receive data from one or more of the other subsystems 104 and may control at least one of the sensors 120 and the actuators 124 based on the data.

In FIG. 1A, the controller 102 also communicates with an infotainment subsystem 106 and a communication subsystem 108 of the vehicle. For example, the infotainment subsystem 106 can be used to provide audio, video, and/or tactile alerts to one or more occupants of the vehicle. For example, the communication subsystem 108 comprises one or more transceivers that can communicate with a distributed communication system 110 shown in FIG. 1C. For example, the distributed communication system 110 may include a cellular network, a WiFi network, a satellite network, and/or the Internet. Accordingly, the controller 102 can communicate with a server 112 (shown in FIG. 1C) in a cloud via the communication subsystem 108 of the vehicle and via the distributed communication system 110.

FIG. 1C shows that the communication subsystem 108 can also communicate with a service tool 114 used by service technicians to test and troubleshoot the subsystem 104. The service tool 114 can access the subsystem 104 of the vehicle through the communication subsystem 108. In some examples, the service tool 114 may also directly attach to the vehicle's CAN bus (described below) and obtain data such as diagnostic test codes and other test results saved in the controller 102. The communication subsystem 108 can also communicate with a mobile device 116 such as a cell phone. For example, the mobile device 116 can generally access only the infotainment subsystem 106 of the vehicle via a Bluetooth interface. The mobile device 116 can also access other secure subsystems and onboard diagnostics of the vehicle via a dongle (not shown). The service tool 114 and the mobile device 116 can also communicate with the server 112 via the distributed communication system 110. Accordingly, the fault diagnostics and prognostics system of the present disclosure can also be implemented at least partially in the server 112, the service tool 114, and/or the mobile device 116.

The controller 102, the subsystems 104, the infotainment subsystem 106, and the communication subsystem 108 are interconnected by a control area network (CAN bus) in the vehicle and communicate with each other via the CAN bus. The controller 102 is configured to execute the methods shown in FIGS. 3A-3C. The methods shown in FIGS. 3A-3C can also be executed by the server 112, the service tool 114, and/or the mobile device 116 after the required data is transferred thereto. The operation of the controller 102 is described in detail with reference to FIGS. 2A-3C. Throughout the present disclosure, the battery subsystem comprising a battery and a starter is used only as an illustrative example to describe various operations of the fault diagnostics and prognostics system of the present disclosure. The teachings of the present disclosure are applicable to any subsystem of the vehicle.

Figure 2A:
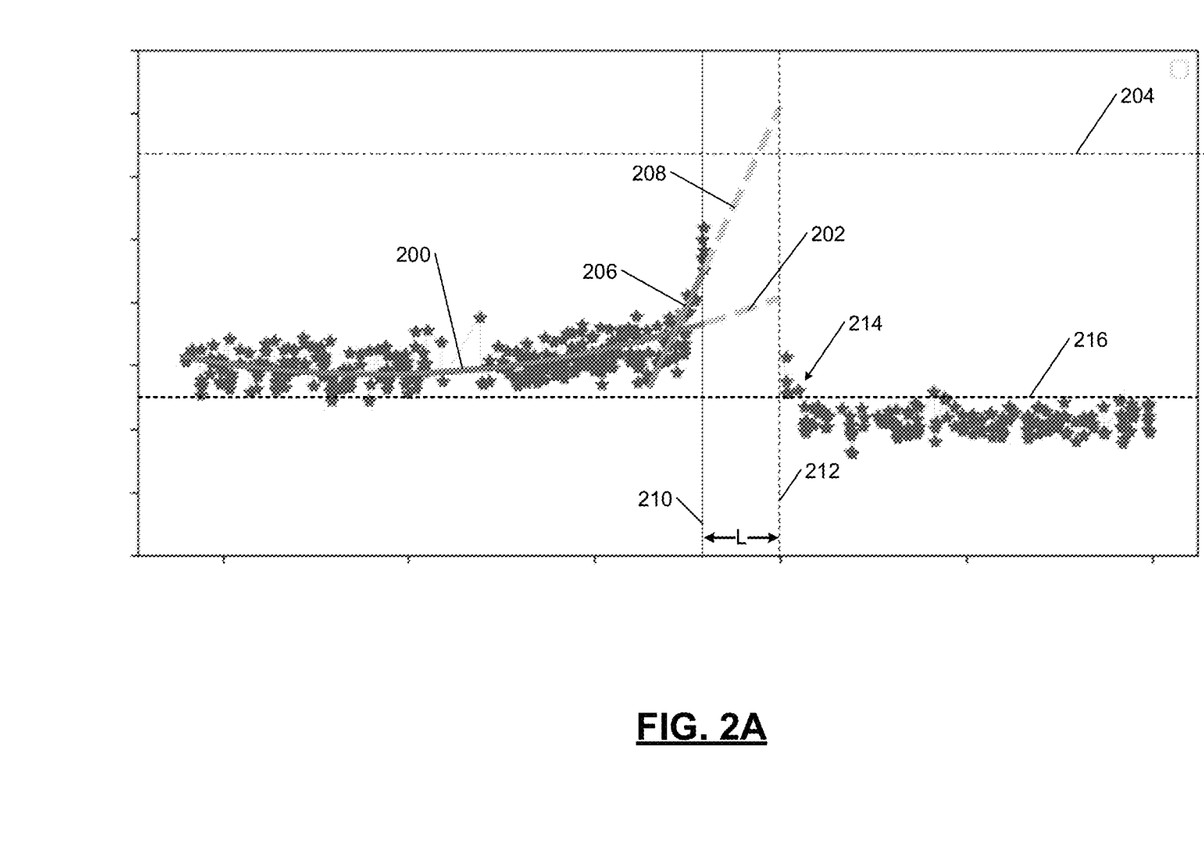
FIGS. 2A and 2B show normalized data from a subsystem of the vehicle plotted against time to illustrate the fault diagnostics and prognostics performed using automatic data segmentation and trending according to the present disclosure.
Figure 2B:
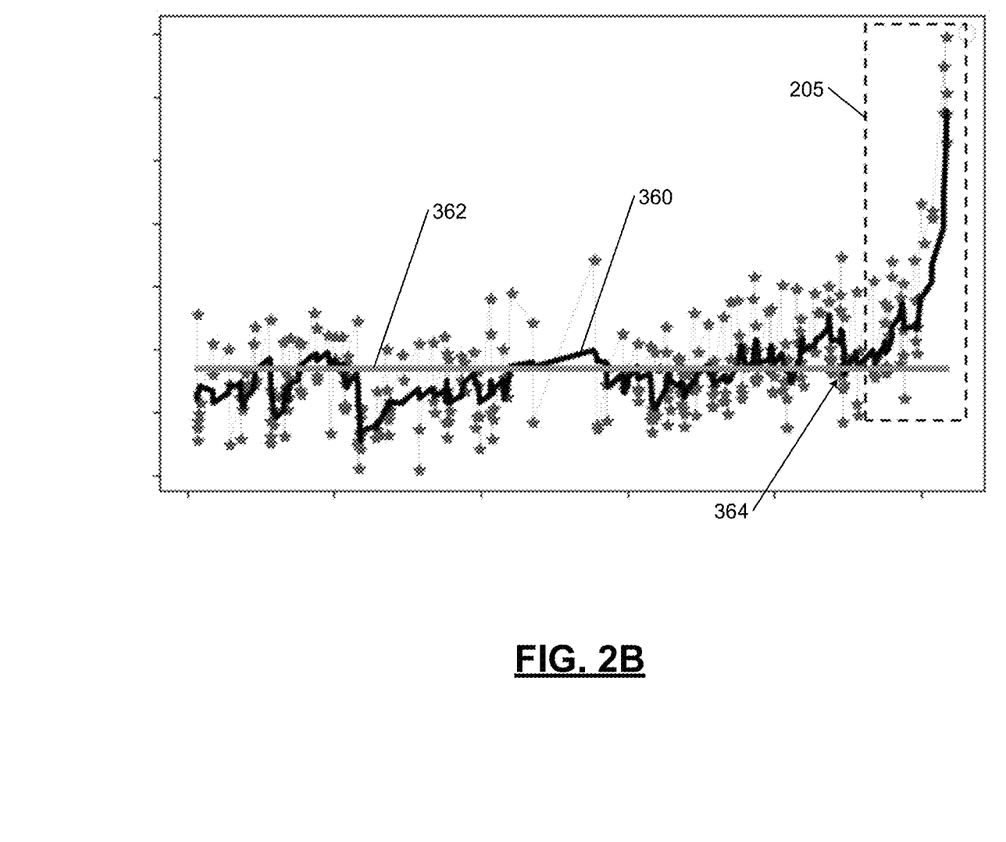
Figure 2C:
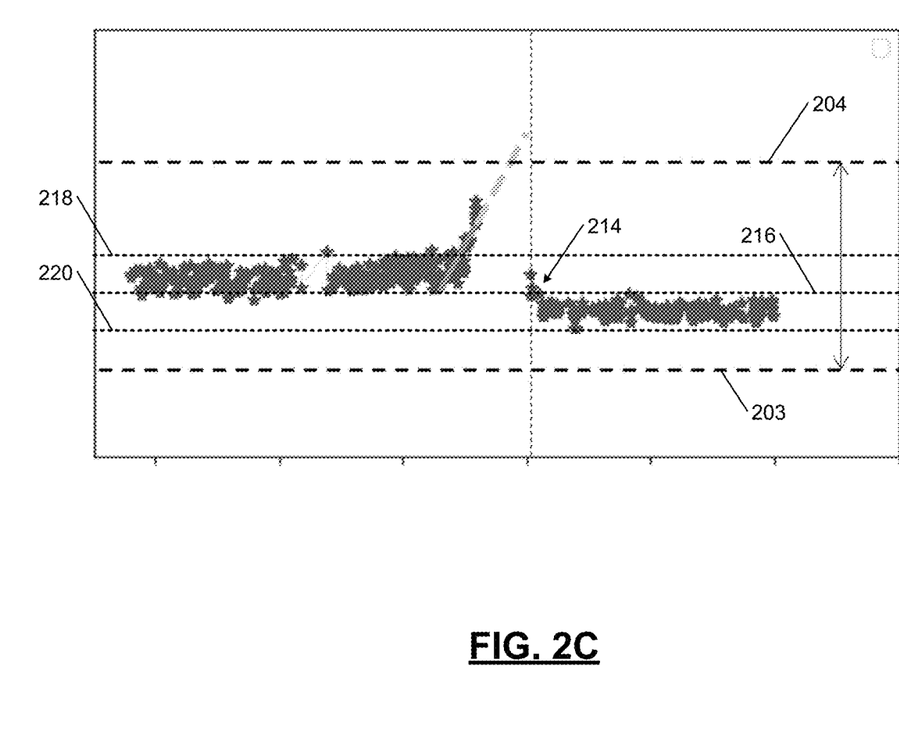
FIG. 2C shows an example of validating a repair performed on a subsystem of the vehicle using normalized data from the subsystem plotted against time according to the present disclosure.

FIGS. 2A and 2B show an example of the fault diagnostics and prognostics of a battery subsystem (e.g., one of the subsystems 104) performed using automatic data segmentation and trending (e.g., by the controller 102) according to the present disclosure. FIG. 2C shows an example of validating a repair according to the present disclosure. For example only, FIGS. 2A-2C show graphs of normalized data collected from one or more sensors (e.g., the sensors 120) of the battery subsystem plotted against time on the X-axis.

In FIG. 2A, typically, the whole dataset collected over a relatively long period of time (e.g., many days) is used for curve fitting, which is used to detect faults. A fitted curve 200 is typically obtained using the entire dataset collected over the relatively long period of time. However, using the whole dataset for curve fitting cannot accurately predict a fault. When the fitted curve 200 is extrapolated, an extrapolated curve 202 cannot reach a fault threshold 204 and therefore cannot detect a fault successfully.

Instead, in FIG. 2B, a segment 205 of the dataset selected according to the present disclosure (shown and explained below in detail with reference to FIGS. 3A and 3B) can indicate a fault trend more accurately. In FIG. 2A, a fitted curve 206 is obtained by curve fitting the data from the selected segment 205 of the dataset. When the fitted curve 206 is extrapolated, an extrapolated curve 208 can reach the fault threshold 204 and can therefore predict the fault successfully. Further, using the extrapolated curve 208, a remaining life L of the failing component (i.e., time duration between points 210 and 212) can also be predicted as explained below in detail.

Furthermore, after a repair is performed at 212, a sudden reversal in the trend as seen at 214 followed by the data value being below a baseline 216 can validate the repair as being successful and necessary. In contrast, a slow reversal in the trend would indicate that the repair was not successful and/or unnecessary (e.g., a different component needs to be repaired/replaced instead). As shown in FIG. 2C, if the data collected after the repair is within empirically determined upper and lower fault thresholds 204, 203 (i.e., within a normal range), the data can indicate that the repair was successful and necessary. The methods used by the controller 102 to perform these operations are now described below in detail.

Figure 3A:
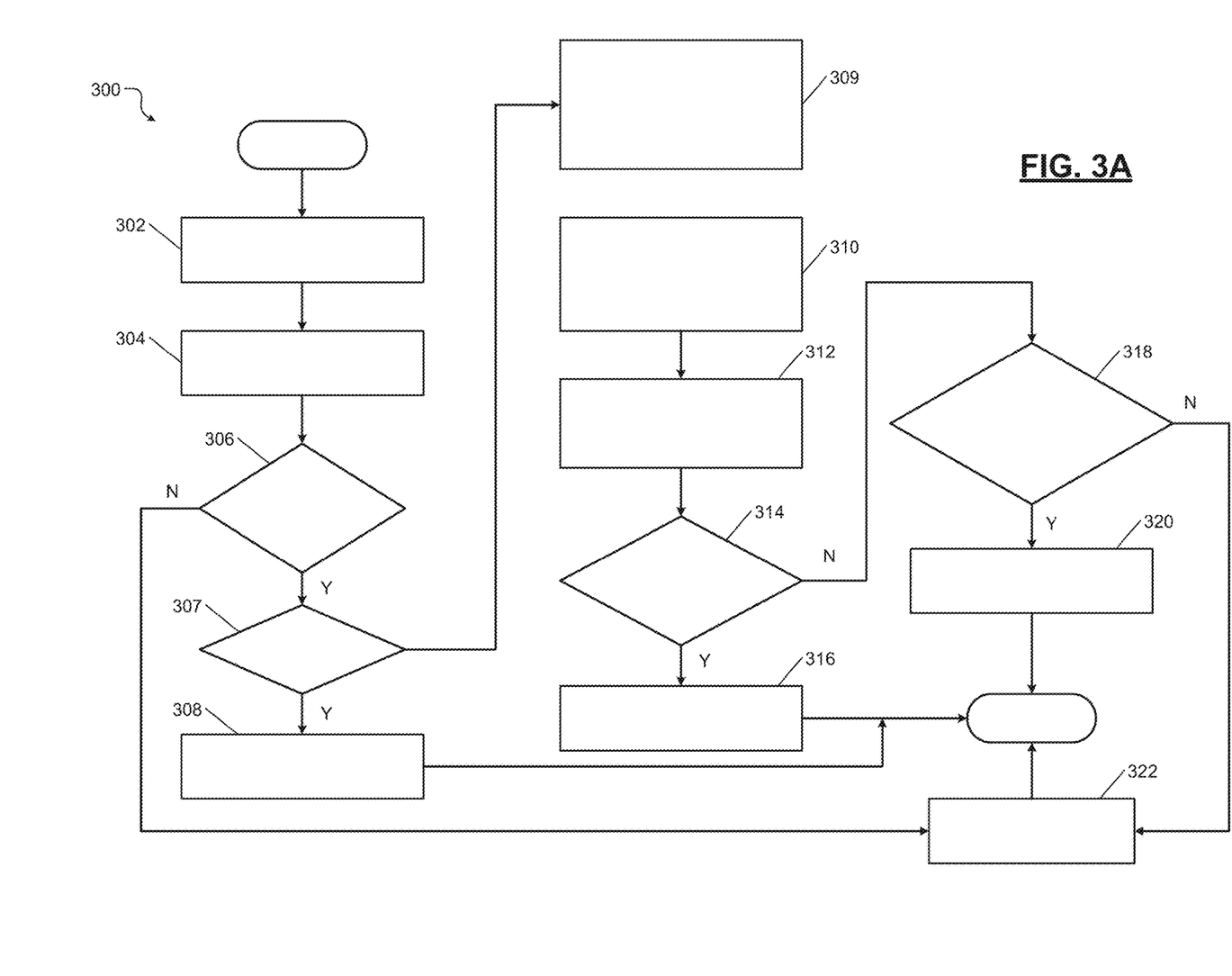
FIGS. 3A and 3B show a method for fault diagnostics and prognostics using automatic data segmentation and trending according to the present disclosure.
Figure 3B:
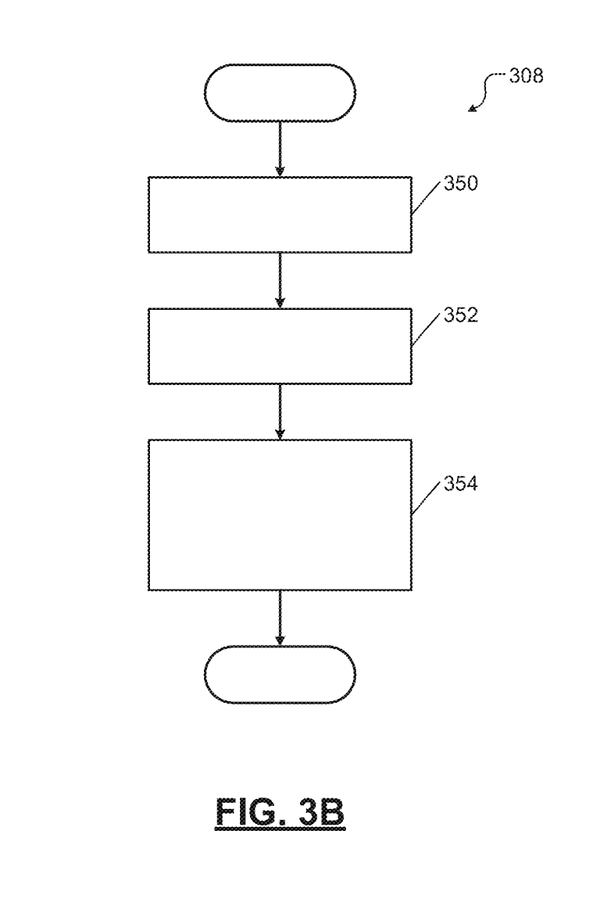
Figure 3C:
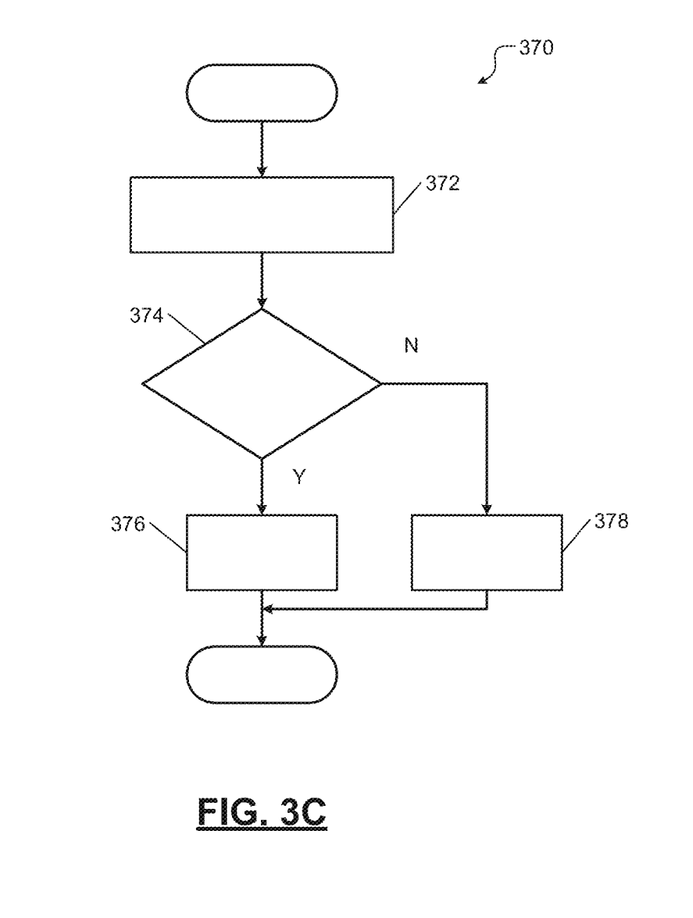
FIG. 3C shows a method for validating a repair performed on a subsystem of the vehicle according to the present disclosure.

FIGS. 3A and 3B show a method 300 for vehicle fault diagnostics and prognostics using automatic data segmentation and trending according to the present disclosure. FIG. 3C shows a method 370 for validating a repair according to the present disclosure. Again, throughout the following description, the battery subsystem is used for example only; and the following teachings can be applied to any of the subsystems 104. Further, the term control in the following description refers to the controller 102.

In FIG. 3A, at 302, when the vehicle is cranked, control collects current cranking data from the sensors associated with the battery subsystem. For example, the cranking data can include battery resistance, starter resistance, cranking time, open circuit voltage of the battery, and charging resistance of the battery. In general, control collects current values of one or more parameters of a subsystem (e.g., one of the subsystems 104) of the vehicle using one or more sensors (e.g., the sensors 120) of the subsystem.

At 304, control retrieves historical cranking data (generally, historical data of the parameters) from memory and aggregates all of the data. For example, the memory may be located in the subsystem, in another subsystem of the vehicle, in the controller 102, or in the server 112 in the cloud.

At 306, control determines if the cranking time or the charging resistance from the current cranking data (generally, a current value of one of the parameters) is greater than a predetermined threshold. Alternatively, depending on the type of parameter, control may instead determine if the current value of the parameter is less than a predetermined threshold. Essentially, control determines if the current value of the parameter has crossed an upper or a lower limit.

If the current cranking time or the charging resistance is not greater than the predetermined threshold (generally, if the current value of the parameter has not crossed an upper or a lower limit), at 322, control determines that the subsystem if operating normally, and control does not generate an alert. Since cranking is not an ongoing operation (i.e., cranking is not repeatedly performed during normal operation of the vehicle), control ends. In case of another subsystem, if control can continue to monitor the operation of the subsystem, control may return to 302 and continue to collect parameter data of the subsystem instead of ending.

At 307, control determines if the cranking ratio is greater or less than a threshold. If the cranking ratio is greater or less than a threshold, at 308, control generates a battery/starter alert. If the cranking ratio is not greater or less than a threshold, control proceeds to 308 to use the trending approach.

If the current cranking time or the charging resistance is greater than the predetermined threshold (generally, if the current value of the parameter has crossed an upper or a lower limit), at 309, control segments the data as explained below in detail with reference to FIG. 3B. Control detects a change point for the battery resistance and the starter resistance (or crank ratio, which is a ratio of the battery resistance to the starter resistance) as explained below in detail with reference to FIG. 3B. Note that control may use one set of parameters (e.g., the cranking time and charging resistance) of a subsystem at 306 and may use another (i.e., different) set of parameters (e.g., crank ratio) to perform trend analysis as described below.

At 310, for the data from the change point to the current point (i.e., the point in time when the current data is collected at 302), control determines a trend in the selected segment of the data using curve fitting and regression. For example, a linear or any other type of regression (e.g., polynomial or exponential regression, or machine leaning based regression, for instance Gaussian regression) may be selected depending on the parameter being observed.

At 312, control extrapolates the trend until the trend reaches a predetermined fault threshold (e.g., the fault threshold 204). Control also estimates the remaining life L (described above with reference to FIG. 2A) of the component of the subsystem (e.g., the battery and the starter in case of the battery subsystem) after which the component of the subsystem will fail.

At 314, control determines if the estimated life for the battery (estimated based on the battery resistance) is less than a threshold (e.g., 3 days) and if the crank ratio is trending up (i.e., generally, a slope of the trend). If the estimated life for the battery is less than the threshold and if the crank ratio is trending up, at 316, control generates an alert for the battery. For example, control informs the occupant via the infotainment subsystem 106 that the battery will fail within the estimated life and that service for the battery should be scheduled. Again, since cranking is not an ongoing operation, control ends. In case of another subsystem, if control can continue to monitor the operation of the subsystem, control may return to 302 and continue to collect parameter data of the subsystem instead of ending.

If the estimated life for the battery is not less than the threshold and if the crank ratio is not trending up, at 318, control determines if the estimated life for the starter (estimated based on the starter resistance) is less than a threshold (e.g., 3 days) and if the crank ratio is trending down (i.e., generally, a slope of the trend) and if the cranking time is greater than a threshold.

If the estimated life for the starter is not less than the threshold and if the crank ratio is not trending down and if the cranking time is not greater than the threshold, at 322, control does not generate an alert for the starter. Again, since cranking is not an ongoing operation, control ends. In case of another subsystem, if control can continue to monitor the operation of the subsystem, control may return to 302 and continue to collect parameter data of the subsystem instead of ending.

If the estimated life for the starter is less than the threshold and if the crank ratio is trending down and if the cranking time is greater than the threshold, at 320, control generates an alert for the starter. For example, control informs the occupant via the infotainment subsystem 106 that the starter will fail within the estimated life and that service for the starter should be scheduled. Again, since cranking is not an ongoing operation, control ends. In case of another subsystem, if control can continue to monitor the operation of the subsystem, control may return to 302 and continue to collect parameter data of the subsystem instead of ending.

FIG. 3B shows the data segmentation step 309 of the method 300 in further detail. At 350, control smooths the historical data using a moving average or other smoothing algorithms. For example, in FIG. 2B, the moving average curve is shown at 360. At 352, control calculates a mean of the smoothed (i.e., averaged) historical data. For example, in FIG. 2B, the mean is shown at 362.

At 354, control identifies a change point (or a transition point) 364 in the data where the moving average is less than the mean by a predetermined amount. The subsequent data that is later in time than the change point 364 represents an upward trend in the dataset. Alternatively, in another example, depending on the subsystem and the parameter of the subsystem being observed, the change point 364 may be where the moving average is greater than the mean by a predetermined amount, and the subsequent data that is later in time than the change point 364 may represent a downward trend in the dataset. After 354, control returns to step 310 of the method 300 shown in FIG. 3A.

Accordingly, the method 300 detects the trend based on the faulty data after the change point 364 and without using the healthy historical data before the change point 364. Therefore, unlike the trend determined based on the whole dataset (i.e., including the healthy and faulty data), the trend determined based only on the faulty data (i.e., excluding the healthy data) can correctly predict fault upon extrapolation.

Note that the trend information can be used for many other purposes. For example, the controller 102 can use the detected to accurately diagnose a fault in the subsystem 104. The controller 102 can modify a control parameter of the vehicle (e.g., a parameter of the autonomous subsystem) to improve vehicle safety. The life of a component of the subsystem 104 can be also be prolonged before the component fails using the detected trend (e.g., by limiting the use of the component, switching to a spare if available, etc.)

FIG. 3C shows a method 370 for validating a repair according to the present disclosure. The method 370 can be performed after a repair recommended by the method 300 (e.g., at 316 or 320) is performed on a subsystem. At 372, control collects data from one or more sensors associated with the subsystem. For example, control collects cranking data from the sensors associated with the battery subsystem. In general, control collects one or more parameters of the subsystem (e.g., one of the subsystems 104) of the vehicle using one or more sensors (e.g., the sensors 120) of the subsystem. Control compares the data collected after the repair to the upper and lower fault thresholds (e.g., thresholds 204, 203 shown in FIG. 2C).

At 374, control determines if the data is within the upper and lower fault thresholds (i.e., within a normal range). In some examples, control may use different thresholds to determine healthy data (e.g., thresholds 218 and 220 shown in FIG. 2C) than the thresholds used to determine faulty data (e.g., thresholds 204, 203 shown in FIG. 2C). If the data is within the upper and lower fault thresholds, at 376, control determines that the repair was successful and necessary. If the data is not within the upper and lower fault thresholds, at 378, control determines that the repair was unsuccessful (i.e., a wrong component was replaced and the faulty component remains to be replaced, or the replaced component is defective or has failed).

Other methods can be used to evaluate or validate the repair. For example, as shown in FIG. 2C, after the repair is performed at 212, a sudden reversal in the trend (i.e., a slope of the trend being greater than a threshold) as seen at 214 followed by the data value being below a baseline 216 can validate the repair as being successful and necessary. In contrast, a slow or gradual reversal in the trend (i.e., a slope of the trend being less than a threshold) would indicate that the repair was not successful and/or unnecessary (e.g., a different component needs to be repaired/replaced instead).

The foregoing description is merely illustrative in nature and is not intended to limit the disclosure, its application, or uses. The broad teachings of the disclosure can be implemented in a variety of forms. Therefore, while this disclosure includes particular examples, the true scope of the disclosure should not be so limited since other modifications will become apparent upon a study of the drawings, the specification, and the following claims. It should be understood that one or more steps within a method may be executed in different order (or concurrently) without altering the principles of the present disclosure. Further, although each of the embodiments is described above as having certain features, any one or more of those features described with respect to any embodiment of the disclosure can be implemented in and/or combined with features of any of the other embodiments, even if that combination is not explicitly described. In other words, the described embodiments are not mutually exclusive, and permutations of one or more embodiments with one another remain within the scope of this disclosure.

Spatial and functional relationships between elements (for example, between modules, circuit elements, semiconductor layers, etc.) are described using various terms, including "connected," "engaged," "coupled," "adjacent," "next to," "on top of," "above," "below," and "disposed." Unless explicitly described as being "direct," when a relationship between first and second elements is described in the above disclosure, that relationship can be a direct relationship where no other intervening elements are present between the first and second elements, but can also be an indirect relationship where one or more intervening elements are present (either spatially or functionally) between the first and second elements. As used herein, the phrase at least one of A, B, and C should be construed to mean a logical (A OR B OR C), using a non-exclusive logical OR, and should not be construed to mean "at least one of A, at least one of B, and at least one of C."

In the figures, the direction of an arrow, as indicated by the arrowhead, generally demonstrates the flow of information (such as data or instructions) that is of interest to the illustration. For example, when element A and element B exchange a variety of information but information transmitted from element A to element B is relevant to the illustration, the arrow may point from element A to element B. This unidirectional arrow does not imply that no other information is transmitted from element B to element A. Further, for information sent from element A to element B, element B may send requests for, or receipt acknowledgements of, the information to element A.

In this application, including the definitions below, the term "module" or the term "controller" may be replaced with the term "circuit." The term "module" or the term "controller" may refer to, be part of, or include: an Application Specific Integrated Circuit (ASIC); a digital, analog, or mixed analog/digital discrete circuit; a digital, analog, or mixed analog/digital integrated circuit; a combinational logic circuit; a field programmable gate array (FPGA); a processor circuit (shared, dedicated, or group) that executes code; a memory circuit (shared, dedicated, or group) that stores code executed by the processor circuit; other suitable hardware components that provide the described functionality; or a combination of some or all of the above, such as in a system-on-chip.

The module or the controller may include one or more interface circuits. In some examples, the interface circuits may include wired or wireless interfaces that are connected to a local area network (LAN), the Internet, a wide area network (WAN), or combinations thereof. The term code, as used above, may include software, firmware, and/or microcode, and may refer to programs, routines, functions, classes, data structures, and/or objects.

The term memory is a subset of the term computer-readable medium. The term computer-readable medium, as used herein, does not encompass transitory electrical or electromagnetic signals propagating through a medium (such as on a carrier wave); the term computer-readable medium may therefore be considered tangible and non-transitory. Non-limiting examples of a non-transitory, tangible computer-readable medium are nonvolatile memory circuits (such as a flash memory circuit, an erasable programmable read-only memory circuit, or a mask read-only memory circuit), volatile memory circuits (such as a static random access memory circuit or a dynamic random access memory circuit), magnetic storage media (such as an analog or digital magnetic tape or a hard disk drive), and optical storage media (such as a CD, a DVD, or a Blu-ray Disc).

The apparatuses and methods described in this application may be partially or fully implemented by a special purpose computer created by configuring a general purpose computer to execute one or more particular functions embodied in computer programs. The functional blocks, flowchart components, and other elements described above serve as software specifications, which can be translated into the computer programs by the routine work of a skilled technician or programmer.

The computer programs include processor-executable instructions that are stored on at least one non-transitory, tangible computer-readable medium. The computer programs may also include or rely on stored data. The computer programs may encompass a basic input/output system (BIOS) that interacts with hardware of the special purpose computer, device drivers that interact with particular devices of the special purpose computer, one or more operating systems, user applications, background services, background applications, etc.

The computer programs may include: (i) descriptive text to be parsed, such as HTML (hypertext markup language), XML (extensible markup language), or JSON (JavaScript Object Notation) (ii) assembly code, (iii) object code generated from source code by a compiler, (iv) source code for execution by an interpreter, (v) source code for compilation and execution by a just-in-time compiler, etc. As examples only, source code may be written using syntax from languages including C, C++, C#, Objective-C, Swift, Haskell, Go, SQL, R, Lisp, Java®, Fortran, Perl, Pascal, Curl, OCaml, Javascript®, HTML5 (Hypertext Markup Language 5th revision), Ada, ASP (Active Server Pages), PHP (PHP: Hypertext Preprocessor), Scala, Eiffel, Smalltalk, Erlang, Ruby, Flash®, Visual Basic®, Lua, MATLAB, SIMULINK, and Python®.

What is claimed is:

1. A system comprising:
a plurality of sensors associated with a plurality of subsystems of a vehicle; and
a controller configured to communicate with the plurality of subsystems of the vehicle and further configured to:
process data received from one or more sensors of one of the subsystems of the vehicle, wherein the processing includes smoothing the data and calculating a mean of the data;
identify a transition point in the processed data where a moving average of the data is less than the mean by a predetermined amount indicating an upward trend or where the moving average is greater than the mean by the predetermined amount indicating a downward trend;
select a segment of the processed data subsequent to the transition point;
detect a trend in the segment of the processed data subsequent to the transition point using regression, wherein the trend includes the upward trend or the downward trend;
extrapolate the detected trend to reach a predetermined fault threshold;
predict a failure of the one of the subsystems based on a slope of the extrapolated trend; and
provide an indication of the prediction based on the slope of the extrapolated trend to schedule a service for the one of the subsystems.

2. The system of claim 1 wherein the controller is further configured to accurately diagnose a fault in the one of the subsystems, modify a control parameter of the vehicle to improve vehicle safety, and/or prolong life of a component of the one of the subsystems before the component fails using the detected trend.

3. The system of claim 1 wherein the controller is further configured to:
detect a second trend in second data collected from the one or more sensors of one of the subsystems after the service; and
evaluate the service based on at least one of whether a second slope of the second trend is greater than a second threshold and whether the second data is within a predetermined range.

4. The system of claim 1 wherein the received data includes first and second data for first and second parameters of the one of the subsystems, respectively, and wherein the controller is further configured to:
determine whether to generate an alert about a condition of the one of the subsystems based on whether the first data for the first parameter has crossed a first threshold; and
detect the trend using the second data for the second parameter,
wherein the second parameter is different than the first parameter.

5. The system of claim 1 wherein the controller is configured to provide the indication of the prediction in response to the slope of the extrapolated trend being greater than a first predetermined threshold.

6. The system of claim 1 wherein the controller is configured to:
estimate an operational life of the one of the subsystems based on the slope of the extrapolated trend; and
provide the indication of the prediction based on the estimation.

7. The system of claim 1 wherein the controller is configured to select a type of the regression depending on a type of a parameter of the one of the subsystems for which the data is received.

8. The system of claim 1 wherein the controller is configured to detect the trend by excluding data before the transition point.

9. The system of claim 1 wherein the controller is located in a computing device remote from the vehicle and wherein the computing device includes a mobile device, a service tool, or a server in a cloud.

10. A system comprising:
a processor; and
a memory storing instructions that when executed by the processor configure the processor to:
process data received from one or more sensors of a subsystem of a vehicle, wherein the processing includes smoothing the data and calculating a mean of the data;
identify a transition point in the processed data where a moving average of the data is less than the mean by a predetermined amount indicating an upward trend or where the moving average is greater than the mean by the predetermined amount indicating a downward trend;
select a segment of the processed data subsequent to the transition point;
detect a trend in the segment using regression, wherein the trend includes the upward trend or the downward trend;
extrapolate the detected trend to reach a predetermined fault threshold;
predict a failure of the subsystem based on a slope of the extrapolated trend; and
provide an indication of the prediction based on the slope of the extrapolated trend to schedule a service for the subsystem.

11. The system of claim 10 wherein the instructions further configure the processor to accurately diagnose a fault in the subsystem, modify a control parameter of the vehicle to improve vehicle safety, and/or prolong life of a component of the subsystem before the component fails using the detected trend.

12. The system of claim 10 wherein the instructions further configure the processor to:
   detect a second trend in second data collected from the one or more sensors of the subsystem after the service; and
   evaluate the service based on at least one of whether a second slope of the second trend is greater than a second threshold and whether the second data is within a predetermined range.

13. The system of claim 10 wherein the received data includes first and second data for first and second parameters of the subsystem, respectively, and wherein the instructions further configure the processor to:
   determine whether to generate an alert about a condition of the subsystem based on whether the first data for the first parameter has crossed a first threshold; and
   detect the trend using the second data for the second parameter,
   wherein the second parameter is different than the first parameter.

14. The system of claim 10 wherein the instructions further configure the processor to provide the indication of the prediction in response to the slope of the extrapolated trend being greater than a first predetermined threshold.

15. The system of claim 10 wherein the instructions further configure the processor to:
   estimate an operational life of the subsystem based on the slope of the extrapolated trend; and
   provide the indication of the prediction based on the estimation.

16. The system of claim 10 wherein the instructions further configure the processor to select a type of the regression depending on a type of a parameter of the subsystem for which the data is received.

17. The system of claim 10 wherein the instructions further configure the processor to detect the trend by excluding data before the transition point.

18. A computing device comprising the system of claim 10 wherein the computing device is remote from the vehicle and includes a mobile device, a service tool, or a server in a cloud.

19. A method comprising:
   processing data received from one or more sensors of a subsystem of a vehicle, wherein the processing includes smoothing the data and calculating a mean of the data;
   identifying a transition point in the processed data where a moving average of the data is less than the mean by a predetermined amount indicating an upward trend or where the moving average is greater than the mean by the predetermined amount indicating a downward trend;
   selecting a segment of the processed data subsequent to the transition point;
   detecting a trend in the segment using regression, wherein the trend includes the upward trend or the downward trend;
   extrapolating the detected trend to reach a predetermined fault threshold;
   predicting a failure of the subsystem based on a slope of the extrapolated trend;
   providing an indication of the prediction based on the slope of the extrapolated trend to schedule a service for the subsystem; and
   using the detected trend to accurately diagnose a fault in the subsystem, modify a control parameter of the vehicle to improve vehicle safety, and/or prolong life of a component of the subsystem before the component fails.

20. The method of claim 19 further comprising:
   detecting a second trend in second data collected from the one or more sensors of the subsystem after the service; and
   evaluating the service based on at least one of whether a second slope of the second trend is greater than a second threshold and whether the second data is within a predetermined range.

* * * * *